United States Patent
Xie et al.

(10) Patent No.: US 12,476,904 B2
(45) Date of Patent: Nov. 18, 2025

(54) PACKET FORWARDING METHOD, DEVICE, AND SYSTEM

(71) Applicant: Huawei Technologies Co., Ltd., Shenzhen (CN)

(72) Inventors: Jingrong Xie, Beijing (CN); Fanghong Duan, Nanjing (CN); Xuesong Geng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 309 days.

(21) Appl. No.: 18/154,399

(22) Filed: Jan. 13, 2023

(65) Prior Publication Data
US 2023/0171184 A1 Jun. 1, 2023

Related U.S. Application Data
(63) Continuation of application No. PCT/CN2021/082060, filed on Mar. 22, 2021.

(30) Foreign Application Priority Data

Jul. 14, 2020 (CN) .......... 202010671831.7
Sep. 9, 2020 (CN) .......... 202010939135.X

(51) Int. Cl.
H04L 45/00 (2022.01)
H04L 45/16 (2022.01)
H04L 45/74 (2022.01)

(52) U.S. Cl.
CPC .......... *H04L 45/34* (2013.01); *H04L 45/16* (2013.01); *H04L 45/74* (2013.01)

(58) Field of Classification Search
None
See application file for complete search history.

(56) References Cited

U.S. PATENT DOCUMENTS

| | | | |
|---|---|---|---|
| 8,908,686 B1 * | 12/2014 | Ghosh | H04L 47/32 370/390 |
| 10,616,063 B1 | 4/2020 | Dutta | |

(Continued)

FOREIGN PATENT DOCUMENTS

| | | |
|---|---|---|
| CN | 109962849 A | 7/2019 |
| CN | 110392347 A | 10/2019 |
| JP | 2012049644 A | 3/2012 |

OTHER PUBLICATIONS

Z.Zhang et al.,"BGP Based Multicast,draft-ietf-bess-bgp-multicast-02",Dec. 12, 2020,total 47 pages.

(Continued)

*Primary Examiner* — Xavier S Wong
(74) *Attorney, Agent, or Firm* — Slater Matsil, LLP

(57) ABSTRACT

This application provides a packet forwarding method, device, and system. The method includes: A first network device obtains a first packet, where the first packet includes a multicast packet; the first network device determines a next-hop destination address DA of the multicast packet based on a source address SA and a first correspondence relationship, where the SA is used to identify a multicast path corresponding to the multicast packet, and the first correspondence relationship includes the SA and a next-hop DA of the first network device on the multicast path; the first network device obtains a second packet based on the next-hop DA, where the second packet is a unicast packet obtained after IPv6 encapsulation is performed on the multicast packet; and the first network device forwards the second packet along the multicast path based on the next-hop DA.

20 Claims, 4 Drawing Sheets

(56) References Cited

U.S. PATENT DOCUMENTS

| | | | |
|---|---|---|---|
| 2011/0299528 A1 | 12/2011 | Yu et al. | |
| 2013/0070745 A1* | 3/2013 | Nixon | H04W 84/02 |
| | | | 370/328 |
| 2015/0201323 A1 | 7/2015 | Tjahjono et al. | |
| 2015/0358226 A1* | 12/2015 | Liu | H04L 45/16 |
| | | | 370/390 |
| 2020/0314016 A1* | 10/2020 | Dutta | H04L 47/15 |

OTHER PUBLICATIONS

Z.Zhang et al.,"Controller Based BGP Multicast Signaling,draft-ietf-bess-bgp-multicast-controller-02",Jan. 3, 2021, total 26 pages.

D.Lamparter et al.,"Destination/Source Routing,draft-ietf-rtgwg-dst-src-routing-07",Sep. 11, 2019, total 41 pages.

R.Raszuk,Ed et al.,"IP Traffic Engineering Architecture with Network Programming,draft-raszuk-teas-ip-te-np-00",Apr. 4, 2020,total 43 pages.

D.Voyer,Ed et al.,"Segment Routing Point-to-Multipoint Policy,draft-voyer-pim-sr-p2mp-policy-01",Oct. 15, 2020, total 23 pages.

D.Voyer,Ed et al.,"SR Replication Segment for Multi-point Service Delivery,draft-voyer-spring-sr-replication-segment-03",Dec. 3, 2020,total 14 pages.

\* cited by examiner

PACKET FORWARDING METHOD, DEVICE, AND SYSTEM

CROSS-REFERENCE TO RELATED APPLICATIONS

This application is a continuation of International Application No. PCT/CN2021/082060, filed on Mar. 22, 2021, which claims priority to Chinese Patent Application No. 202010671831.7, filed on Jul. 14, 2020, and Chinese Patent Application No. 202010939135.X, filed on Sep. 9, 2020. The disclosures of the aforementioned applications are hereby incorporated by reference in their entireties.

TECHNICAL FIELD

This application relates to the network communication field, and more specifically, to a packet forwarding method, device, and system.

BACKGROUND

Multicast is a data transmission mode of transmitting data to a plurality of receivers on a transmission control protocol (TCP)/internet protocol (IP) network at a same time in an efficient manner by using one multicast address. A multicast source sends a multicast flow to multicast group members in a multicast group by using a link in a network. All multicast group members in the multicast group can receive the multicast flow. A multicast transmission mode implements a point-to-multipoint data connection between a multicast source and multicast group members. The multicast flow is transmitted only once on each network link, and the multicast is replicated only when the link has a branch. Therefore, the multicast transmission mode improves data transmission efficiency and reduces a possibility that congestion occurs in a backbone network.

An IP multicast technology uses a multicast group address as a destination address of a packet, and establishes a multicast forwarding tree by using protocol independent multicast (PIM) signaling. The multicast forwarding tree is used to make a network plane logically tree-shaped to implement point-to-multipoint data forwarding of the multicast. This IP multicast technology for constructing a multicast forwarding tree can implement point-to-multipoint efficient data transmission in the IP network, and can effectively save a network bandwidth and reduce a network load.

In a related technical solution, each device in a network needs to reserve a plurality of addresses for a plurality of multicast trees. Different addresses are used to distinguish between different multicast trees. In this way, large address space is wasted.

SUMMARY

This application provides a packet forwarding method, device, and system, which can reduce a waste of address space.

According to a first aspect, a packet forwarding method is provided, including: A first network device obtains a first packet, where the first packet includes a multicast packet; the first network device determines a next-hop destination address DA of the multicast packet based on a source address SA and a first correspondence relationship, where the SA is used to identify a multicast path corresponding to the multicast packet, and the first correspondence relationship includes the SA and the next-hop DA of the first network device on the multicast path; the first network device obtains a second packet based on the next-hop DA, where the second packet is a unicast packet obtained after IPv6 encapsulation is performed on the multicast packet; and the first network device forwards the second packet along the multicast path based on the next-hop DA.

In the foregoing technical solution, only a root node (an ingress device) needs to reserve a plurality of corresponding addresses for a plurality of multicast trees, and other devices do not need to reserve a plurality of corresponding addresses for the plurality of multicast trees. In this way, when the ingress device is used as the root node to establish the plurality of multicast trees, a waste of IPv6 address space can be reduced.

In a possible implementation, before the first network device determines the next-hop destination address DA based on the source address SA and the first correspondence relationship, the method further includes: The first network device determines the SA.

In another possible implementation, the first network device is an ingress device, the first packet is the multicast packet, and the first network device determines the multicast path corresponding to the multicast packet; and the first network device determines the SA based on the multicast path and a correspondence relationship between a multicast path and an SA.

In another possible implementation, the first network device is a transit device or an egress device, the first packet is a unicast packet obtained after IPv6 encapsulation is performed on the multicast packet, and the first network device determines whether a DA of the first packet is an address of the first network device; and if the DA of the first packet is an IPv6 address of the first network device, the first network device reads an SA of the first packet based on the DA of the first packet.

In another possible implementation, the method further includes: The first network device receives configuration information from a control device, where the configuration information includes the SA and the multicast path corresponding to the multicast packet; and the first network device establishes the first correspondence relationship based on the configuration information.

In another possible implementation, the multicast path includes an internet protocol version 6 IPv6 address of a next-hop device of the first network device, and the first network device sends the second packet to the next-hop device based on that the next-hop DA is the IPv6 address of the next-hop device.

In another possible implementation, the multicast path indicates to decapsulate a packet, and the method further includes: The first network device decapsulates the second packet to obtain the multicast packet; and the first network device forwards the multicast packet.

In another possible implementation, the SA is an IPv6 address.

According to a second aspect, a first network device is provided, including: a receiving module, configured to obtain a first packet, where the first packet includes a multicast packet; a processing module, configured to determine a next-hop destination address DA of the multicast packet based on a source address SA and a first correspondence relationship, where the SA is used to identify a multicast path corresponding to the multicast packet, and the first correspondence relationship includes the SA and the next-hop DA of the first network device on the multicast path, where the processing module is further configured to obtain a second packet based on the next-hop DA, where the second packet is a unicast packet obtained after IPv6 encapsulation is performed on the multicast packet; and a sending module, configured to forward the second packet along the multicast path based on the next-hop DA.

In a possible implementation, the processing module is further configured to determine the SA.

In another possible implementation, the first network device is an ingress device, the first packet is the multicast packet, and the processing module is further configured to: determine the multicast path corresponding to the multicast packet; and determine the SA based on the multicast path and a correspondence relationship between a multicast path and an SA.

In another possible implementation, the first network device is a transit device or an egress device, the first packet is a unicast packet obtained after IPv6 encapsulation is performed on the multicast packet, and the processing module is specifically configured to: determine whether a DA of the first packet is an IPv6 address of the first network device; and if the DA of the first packet is the IPv6 address of the first network device, read an SA of the first packet based on the DA of the first packet.

In another possible implementation, the receiving module is further configured to receive configuration information from a control device, where the configuration information includes the SA and the multicast path corresponding to the multicast packet; and the processing module is further configured to establish the first correspondence relationship based on the configuration information.

In another possible implementation, the multicast path includes an internet protocol version 6 IPv6 address of a next-hop device of the first network device, and the sending module is specifically configured to send the second packet to the next-hop device based on that the next-hop DA is the IPv6 address of the next-hop device.

In another possible implementation, the multicast path indicates to decapsulate a packet, and the processing module is further configured to decapsulate the second packet to obtain the multicast packet; and the sending module is further configured to forward the multicast packet.

In another possible implementation, the SA is an IPv6 address.

Beneficial effects of the second aspect and any possible implementation of the second aspect and beneficial effects of the first aspect and any possible implementation of the first aspect are corresponding, and details are not described herein again.

According to a third aspect, a first network device is provided, where the first network device has a function of implementing behavior of the first network device in the foregoing method. The function may be implemented based on hardware, or may be implemented based on that hardware executes corresponding software. The hardware or the software includes one or more modules corresponding to the foregoing function.

In a possible design, a structure of the first network device includes a processor and an interface, and the processor is configured to support the first network device in performing a corresponding function in the foregoing method. The interface is configured to support the first network device in obtaining a first packet.

The first network device may further include a memory, and the memory is configured to be coupled to the processor to store program instructions and data that are necessary for the first network device.

In another possible design, the first network device includes a processor, a transmitter, a receiver, a random access memory, a read-only memory, and a bus. The processor is separately coupled to the transmitter, the receiver, the random access memory, and the read-only memory by using the bus. When the first network device needs to be run, a basic input/output system that is built in the read-only memory or a bootloader boot system in an embedded system is used to start, to guide the first network device to enter a normal running state. After the first network device enters the normal running state, an application program and an operating system are run in the random access memory, so that the processor performs the method in the first aspect or any possible implementation of the first aspect.

According to a fourth aspect, a first network device is provided, where the first network device includes a main control board and an interface board, and may further include a switching board. The first network device is configured to perform the method in the first aspect or any possible implementation of the first aspect. Specifically, the first network device includes a module configured to perform the method in the first aspect or any possible implementation of the first aspect.

According to a fifth aspect, a first network device is provided, where the first network device includes a control module and a first forwarding sub-device. The first forwarding sub-device includes an interface board, and may further include a switching board. The first forwarding sub-device is configured to perform a function of the interface board in the fourth aspect, and may further perform a function of the switching board in the fourth aspect. The control module includes a receiver, a processor, a transmitter, a random access memory, a read-only memory, and a bus. The processor is separately coupled to the receiver, the transmitter, the random access memory, and the read-only memory by using the bus. When the control module needs to be run, a basic input/output system that is built in the read-only memory or a bootloader boot system in an embedded system is used to start, to guide the control module to enter a normal running state. After the control module enters the normal running state, an application program and an operating system are run in the random access memory, so that the processor performs a function of the main control board in the fourth aspect.

It may be understood that, in actual application, the first network device may include any quantity of interfaces, processors, or memories.

According to a sixth aspect, a computer program product is provided, where the computer program product includes computer program code. When the computer program code is run on a computer, the computer performs the method in the first aspect or any possible implementation of the first aspect.

According to a seventh aspect, a computer readable medium is provided, where the computer readable medium stores program code. When the computer program code is run on a computer, the computer performs the method in the first aspect or any possible implementation of the first aspect. The computer readable storage media includes but is not limited to one or more of the following: a read-only memory (ROM), a programmable ROM (PROM), an erasable PROM (EPROM), a Flash memory, an electrically EPROM (EEPROM), and a hard disk drive (hard drive).

According to an eighth aspect, a chip is provided, where the chip includes a processor and a data interface. The processor reads, by using the data interface, instructions stored in a memory, to perform the method in the first aspect or any possible implementation of the first aspect. In a specific implementation process, the chip may be implemented in a form of a central processing unit (CPU), a micro controller unit (micro controller unit, MCU), a micro processing unit (MPU), a digital signal processor (DSP), a system on chip (SoC), an application-specific integrated circuit (ASIC), a field programmable gate array (FPGA), or a programmable logic device (PLD).

According to a ninth aspect, a packet forwarding system is provided, and the system includes the foregoing first network device.

DETAILED DESCRIPTION OF ILLUSTRATIVE EMBODIMENTS

Figure 1:
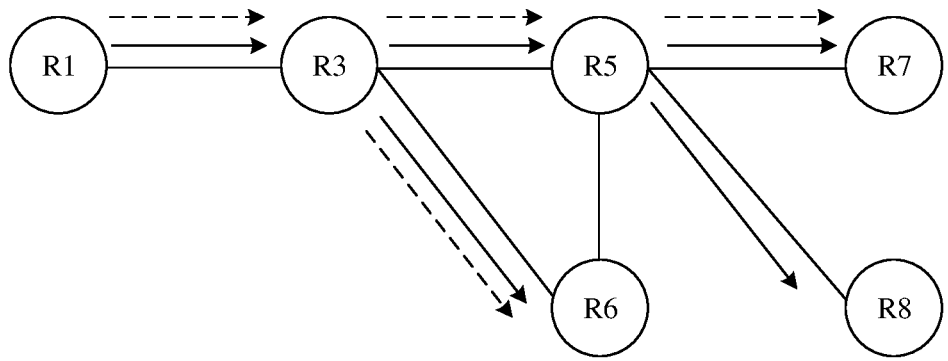
FIG. 1 is a schematic diagram of a scenario according to an embodiment of this application.

The following describes technical solutions of this application with reference to the accompanying drawings.

All aspects, embodiments, or features are presented in this application by describing a system that includes a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, the word such as "example" in embodiments of this application is used to represent giving an example, an illustration, or a description. Any embodiment or design scheme described as an "example" in this application should not be explained as being more preferred or having more advantages than another embodiment or design scheme. To be exact, use of the word "example" is intended to present a concept in a specific manner.

In embodiments of this application, "relevant" and "corresponding" may be sometimes interchangeably used. It should be noted that, when a difference is not emphasized, meanings to be expressed are the same.

A network architecture and a service scenario described in embodiments of this application are intended to describe the technical solutions in embodiments of this application more clearly, and do not constitute any limitation on the technical solutions provided in embodiments of this application. A person of ordinary skill in the art may know that, with evolution of a network architecture and emergence of a new service scenario, the technical solutions provided in embodiments of this application are also applicable to a similar technical problem.

Referring to "one embodiment", "some embodiments", or the like described in this specification means that specific features, structures, or characteristics described with reference to the embodiments are included in one or more embodiments of this application. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

In this application, "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between associated objects. "At least one of the following" or a similar expression thereof refers to any combination of these items, including a singular item or any combination of plural items. For example, at least one of a, b, or c may indicate: a, b, c, a and b, a and c, b and c, or a, b, and c, where a, b, and c may be singular or plural.

Multicast is a data transmission mode of transmitting data to a plurality of receivers on a transmission control protocol (TCP)/internet protocol (IP) network at a same time in an efficient manner by using one multicast address. A multicast source sends a multicast flow to multicast group members in a multicast group by using a link in a network. All multicast group members in the multicast group can receive the multicast flow. A multicast transmission mode implements a point-to-multipoint data connection between a multicast source and multicast group members. The multicast flow is transmitted only once on each network link, and the multicast is replicated only when the link has a branch. Therefore, the multicast transmission mode improves data transmission efficiency and reduces a possibility that congestion occurs in a backbone network.

An IP multicast technology uses a multicast group address as a destination address of a packet, and establishes a multicast forwarding tree by using protocol independent multicast (PIM) signaling. The multicast forwarding tree is used to make a network plane logically tree-shaped to implement point-to-multipoint data forwarding of the multicast. This IP multicast technology for constructing a multicast forwarding tree can implement point-to-multipoint efficient data transmission in the IP network, and can effectively save a network bandwidth and reduce a network load, and therefore, has a wide application in a plurality of aspects, such as real-time data transfer, multimedia conferencing, data copying, interactive network televisions (IPTV), games, and simulation.

In a related technical solution, the foregoing IP multicast technology is implemented by using an internet protocol version 6 (IPv6) unicast address as a destination address of a packet. A point-to-multipoint (P2MP) forwarding path is established between one ingress router and a plurality of egress routers, and a multicast packet is forwarded along the P2MP forwarding path. As an example, a P2MP forwarding path may be used as a tunnel, an ingress router encapsulates a multicast packet into a tunnel, and an egress router decapsulates and restores the multicast packet and sends the multicast packet.

The scenario shown in FIG. 1 is used as an example. A segment routing replication (SR-replication) domain in FIG. 1 may include R1, R3, R5, R6, R7, and R8. R1_1s an ingress device of the segment routing replication domain, and is responsible for performing IPv6 encapsulation on a multicast packet, and specifically, may encapsulate an IPv6 header on an outer layer of the multicast packet. The IPv6 header may include a destination address (DA) field and a source address (SA) field. R3 and R5 are transit devices in the segment routing replication domain, and are responsible for forwarding the packet based on a destination address (DA) in the IPv6 header encapsulated at the outer layer of the multicast packet. R6, R7, and R8 are egress devices of the segment routing replication domain, and are responsible for decapsulating an encapsulated multicast packet, and then forwarding a multicast packet at an internal layer.

When a plurality of multicast trees (which may also be referred to as P2MP trees) need to be established by using R1 as a root node, in the foregoing related technical solution, all nodes (R1, R3, R5, R6, R7, and R8) in the segment routing replication domain shown in FIG. 1 need to reserve a plurality of addresses in respective IPv6 address space, thereby implementing establishment of the plurality of multicast trees by using R1 as a root node.

A multicast tree identified by a solid line shown in FIG. 1 is used as an example. Information about the multicast tree identified by the solid line as delivered by a controller is shown in the following Table 1.

TABLE 1

Information about the multicast tree identified by the solid line

R1: (RepID = 1, branch = R3)    //(RepID, branch) information delivered by the controller to R1;
R3: (RepID = 1, branch = R5/R6)    //(RepID, branch) information delivered by the controller to R3;
R5: (RepID = 1, branch = R7/R8)    //(RepID, branch) information delivered by the controller to R5;
R6: (RepID = 1, branch = Decap)    //(RepID, branch) information delivered by the controller to R6;
R7: (RepID = 1, branch = Decap)    //(RepID, branch) information delivered by the controller to R7;
R8: (RepID = 1, branch = Decap)    //(RepID, branch) information delivered by the controller to R8;

Replication ID (RepID)=1 is the multicast tree identified by the solid line. Branch information of a device may indicate one or more P2MP downstream devices of the device. It should be understood that if the device is a leaf device of the P2MP, packet decapsulation generally needs to be performed on the device, and then the multicast packet at the internal layer is forwarded. Therefore, the leaf device may have no downstream device, and branch information corresponding to the leaf device may be represented by using decapsulation (decap).

A correspondence relationship generated by each device in FIG. 1 based on information about the multicast tree identified by the solid line as delivered by the controller is shown in the following Table 2.

TABLE 2

Correspondence relationship of the multicast tree identified by the solid line

R1: (DA = R1_1, branch_IP = R3_1);
R3: (DA = R3_1, branch_IP = R5_1/R6_1)
R5: (DA = R5_1, branch_IP = R7_1/R8_1)
R6: (DA = R6_1, branch_IP = Decap)
R7: (DA = R7_1, branch_IP = Decap)
R8: (DA = R8_1, branch_IP = Decap)

A destination address (DA) R1_1 in the table is determined based on a node identifier (node ID) of R1 and RepID=1. When applied to an IPv6 data plane, R1_1 is an IPv6 address. A manner of determining another address is the same as a manner of determining the destination address R1_1, and details are not described herein again.

A multicast tree identified by a dashed line shown in FIG. 1 is used as an example. Information about the P2MP tree identified by the dashed line as delivered by the controller is shown in Table 3.

TABLE 3

Information about the multicast tree identified by the dashed line

R1: (RepID = 2, branch = R3)    //(RepID, branch) information delivered by a controller to R1;
R3: (RepID = 2, branch = R5/R6)    //(RepID, branch) information delivered by the controller to R3;
R5: (RepID = 2, branch = R7)    //(RepID, branch) information delivered by a controller to R5;
R6: (RepID = 2, branch = Decap)    //(RepID, branch) information delivered by the controller to R6;
R7: (RepID = 2, branch = Decap)    //(RepID, branch) information delivered by the controller to R7;
R8: (RepID = 2, branch = Decap)    //(RepID, branch) information delivered by the controller to R8;

Replication ID (RepID)=2 is the multicast tree identified by the dashed line.

A correspondence relationship generated by each device in FIG. 1 based on information about the multicast tree identified by the dashed line as delivered by the controller is shown in the following Table 4.

TABLE 4

Correspondence relationship corresponding to the multicast tree identified by the dashed line R1: (DA = R1_2, branch_IP = R3_2);
R3: (DA = R3_2, branch_IP = R5_2/R6_2)
R5: (DA = R5_2, branch_IP = R7_2)
R6: (DA = R6_2, branch_IP = Decap)
R7: (DA = R7_2, branch_IP = Decap)
R8: (DA = R8_2, branch_IP = Decap)

R1 is used as an example. If a destination address in an IPv6 header at an outer layer of a packet is obtained as R1_1, a forwarding plane further searches a forwarding table of DA=R1_1 for an entry of P2MP described above, and learns that the packet needs to be "replicated" to R3_1. Therefore, the forwarding plane changes the destination address of the packet to R3_1 and sends the packet to R3. Thereafter, the packet is sent to each leaf node along the P2MP tree identified by the solid line, and decapsulated by each leaf node.

If a destination address in an IPv6 header at an outer layer of a packet is obtained as R1_2, a forwarding plane further searches a forwarding table of DA=R1_2 for an entry of P2MP described above, and learns that the packet needs to be "replicated" to R3_2. Therefore, the forwarding plane changes the destination address of the packet to R3_2 and sends the packet to R3. Thereafter, the packet is sent to each leaf node along the P2MP tree identified by the dashed line, and decapsulated by each leaf node.

That is, in the foregoing related technical solution, each device in a network reserves a plurality of addresses for a plurality of multicast trees. Different addresses are used to distinguish between different multicast trees. For example, if R1_1s used as a root node to establish two multicast trees, and R5 is used as an example, R5 reserves two addresses, which are respectively R5_1 and R5_2, where R5_1 represents a multicast tree that is identified by a solid line and that uses R1 as a root node, and R5_2 represents a multicast tree that is identified by a dashed line and that uses R1 as a root node.

If there are 100 devices in the network, R1 needs to be used as a root node to establish 1000 multicast trees. In the foregoing related technical solution, each device needs to reserve 1000 addresses in IPv6 address space of each device. In total, 100*1000 addresses need to be reserved, and relatively large address space is wasted.

In view of this, an embodiment of this application provides a packet forwarding method. Only a root node R1 needs to reserve a plurality of corresponding addresses for a plurality of multicast trees, and other devices do not need to reserve a plurality of corresponding addresses for the plurality of multicast trees. In this way, when R1_1s used as a root node to establish the plurality of multicast trees, a waste of IPv6 address space can be reduced.

Figure 2:
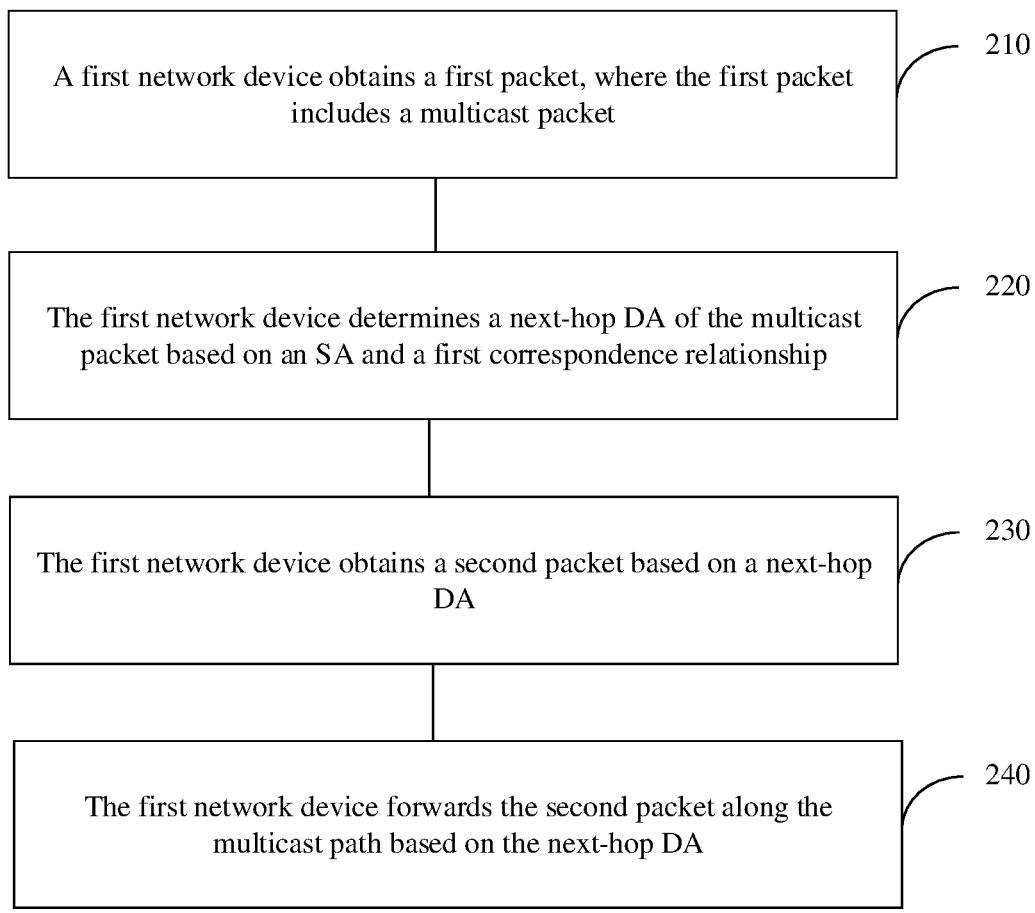
FIG. 2 is a schematic flowchart of a packet forwarding method according to an embodiment of this application.

With reference to FIG. 2, the following describes in detail a packet forwarding method provided in an embodiment of this application.

FIG. 2 is a schematic flowchart of a packet forwarding method according to an embodiment of this application. As shown in FIG. 2, the method may include steps 210-230. The following separately describes steps 210-230 in detail.

Step 210: A first network device obtains a first packet, where the first packet includes a multicast packet.

The first network device may be an ingress device, or may be an intermediate forwarding device, or may be an egress device. This is not specifically limited in this application.

For example, the first network device is an ingress device, and the first packet obtained by the first network device may be a multicast packet.

For example, the first network device is an intermediate forwarding device or an egress device, the first packet obtained by the first network device may be an IPv6 packet, the IPv6 packet is a packet obtained after IPv6 encapsulation is performed on the multicast packet, and the IPv6 packet is a unicast packet.

Step 220: The first network device determines a next-hop destination address (destination address, DA) of the multicast packet based on a source address (SA) and a first correspondence relationship.

In this embodiment of this application, the SA may be used to identify a multicast path corresponding to the multicast packet. That is, different SAs may correspond to different multicast paths, and different multicast paths may be distinguished by using different SAs.

It should be understood that the multicast path refers to an entire forwarding path from an ingress node to an egress node of the multicast packet, and there may be one or more egress nodes. This is not specifically limited in this application. As an example, when there are a plurality of egress nodes of the multicast packet, the multicast path may also be referred to as a point-to-multipoint path, where a point represents the ingress node of the multicast packet, and a multipoint may represent the plurality of egress nodes of the multicast packet.

Optionally, before step 220, the first network device may further determine the SA. There are a plurality of specific implementations. This application sets no specific limitation thereto. The following describes a possible implementation in detail.

In a possible implementation, for example, the first network device may be an ingress device. After receiving the multicast packet, the first network device may determine, based on multicast flow information of the multicast packet, a multicast path for forwarding the multicast packet, and then determine an SA of the multicast packet based on a correspondence relationship between a multicast path and an SA. The first network device encapsulates the SA into an IPv6 header at an outer layer of the multicast packet to obtain an encapsulated IPv6 packet.

In another possible implementation, for example, the first network device is an intermediate forwarding device or an egress device, the first network device receives one IPv6 packet (the first packet), the first packet includes an IPv6 header at an outer layer and the multicast packet, and the IPv6 header at the outer layer of the first packet includes an SA and a DA. If the DA of the IPv6 header at the outer layer of the first packet is an address of the first network device (for example, an IPv6 address), the first network device determines, based on the DA of the IPv6 header at the outer layer of the first packet, that an SA of the IPv6 header at the outer layer of the first packet needs to be read. Based on the read SA of the IPv6 header at the outer layer of the first packet, the first network device may search the first correspondence relationship and determine the next-hop DA of the multicast packet, where the first correspondence relationship includes the SA and the next-hop DA of the first network device on the multicast path.

It should be understood that the next-hop DA in the first correspondence relationship is a DA list, and the list includes one or more next-hop DAs. That is, the first correspondence relationship includes the SA and one or more next-hop DAs of the first network device on the multicast path.

It should be further understood that, in this embodiment of this application, next-hop DAs of the multicast packet that are determined based on the SA and the first correspondence relationship are all next-hop DAs of the list.

It should be noted that the next-hop DA of the multicast packet is an address of a next-hop device of the first network device, for example, an IPv6 address of the next-hop device. The next-hop device is a device that supports multicast packet forwarding based on a unicast destination address of an IPv6 packet. The next-hop device may be a device directly connected to the first network device, or may be a device indirectly connected to the first network device by using another node in the network. This is not specifically limited in this application.

The scenario shown in FIG. 1 is used as an example. R1_1s the first network device, R3 is the next-hop device of the first network device, and R3 may forward the multicast packet based on a unicast destination address of an IPv6 packet. If there is still a device R13 (not shown in FIG. 1), between R1 and R3, that does not perform multicast packet forwarding based on the unicast destination address of the IPv6 packet, in one possible case, R13 is a device that does not support multicast forwarding based on the unicast address as described above, and therefore such a device needs to be traversed (or referred to as skipped) when a corresponding forwarding table is generated. In another possible case, R13 is a device that supports multicast forwarding based on the unicast address as described above, but such a device is traversed (or referred to as skipped) when a corresponding forwarding table is generated, to improve forwarding performance of the device. This is not specifically limited in this application. A next-hop DA of the packet received by R13 is not R13 itself. Therefore, the packet is transparently transmitted, and the packet is forwarded to the next-hop device of the first network device based on the next-hop DA in the packet.

Optionally, before step 220, the first network device may further establish the first correspondence relationship. As an example, the first network device may receive configuration information from a control device, where the configuration information includes the SA and the multicast path corresponding to the multicast packet. The first network device establishes the first correspondence relationship based on the configuration information.

It should be noted that the control device may be an independent device, for example, an independent controller, or may be a control function (for example, a control plane of a forwarding device) performed by a forwarding device that forwards a packet. This is not specifically limited in this application.

There may be a plurality of forms of the first correspondence relationship. In a possible implementation, the first correspondence relationship includes an SA identifying a corresponding multicast path and the multicast path. The multicast path includes a list of next-hop devices to which the first network device performs forwarding along the multicast path, and the list includes IP addresses of one or more next-hop devices. For example, the multicast path is branch (branch) information of a multicast tree, and is used to indicate to replicate a packet to one or more next-hop devices in the list. In another possible implementation, the first correspondence relationship includes an SA identifying a multicast path, a list of next-hop devices to which the first network device performs forwarding along the multicast path, and indication information, where the indication information is used to indicate to replicate a packet to one or more next-hop devices in the list.

Optionally, in some embodiments, when the first network device is an egress node, there is no IP address of the next-hop device in the list, and the branch (branch) information of the multicast tree or indication information in a table indicates to decapsulate a packet.

Optionally, in some embodiments, when the first network device is an egress node and also serves as a transit node of some other nodes, the branch list includes both an IP address of the next-hop device and indication information indicating to decapsulate a packet.

The next-hop DA of the multicast packet determined by the first network device based on the source address SA and the first correspondence relationship may be an IPv6 address of the next-hop device to which the first network device performs forwarding along the multicast path.

Step 230: The first network device obtains a second packet based on the next-hop DA.

For example, the first network device is an ingress device, and the first packet obtained by the first network device is a multicast packet. After obtaining the next-hop DA (an address of the next-hop device of the first network device) of the multicast packet in step 220, the first network device may encapsulate the next-hop DA in an IPv6 header at an outer layer of the multicast packet to obtain a second packet, where the second packet is a unicast packet obtained after IPv6 encapsulation is performed on the multicast packet.

For example, the first network device is an intermediate forwarding device or an egress device, the first packet obtained by the first network device is an IPv6 packet, and an IPv6 header at an outer layer of the first packet includes an SA and a DA. After obtaining the next-hop DA (the address of the next-hop device of the first network device) of the multicast packet in step 220, the first network device may determine that the DA in the received IPv6 header at the outer layer of the first packet is the next-hop DA of the multicast packet, to obtain the second packet.

For a specific description of the next-hop DA and the address of the next-hop device of the first network device, refer to descriptions in step 220. Details are not described herein again.

Step 240: The first network device forwards the second packet along the multicast path based on the next-hop DA.

The first network device forwards the second packet along the determined multicast path based on the next-hop DA. In an example, the multicast path includes an IPv6 address of the next-hop device of the first network device, and the first network device sends the second packet to the next-hop device of the first network device based on that the next-hop DA is the IPv6 address of the next-hop device.

Optionally, if the first network device is an egress (egress) device, the multicast path indicates the first network device to decapsulate the packet. The first network device decapsulates the second packet based on the multicast path, to obtain the multicast packet, and forwards the multicast packet.

In the foregoing technical solution, only a root node of a multicast tree needs to reserve a plurality of corresponding IPv6 addresses for a plurality of multicast trees, and other devices only need to configure one IPv6 address as a destination address, to implement multicast forwarding of the plurality of multicast trees. If there are 100 devices in a network, 1000 multicast trees need to be established by using a root node. In a related technical solution, each device needs to reserve 1000 addresses in respective IPv6 address space, and a total of 100*1000 addresses need to be reserved. However, in this application, a root node only needs to allocate 1000 addresses to 1000 multicast trees, thereby reducing a waste of IPv6 address space.

Figure 3:
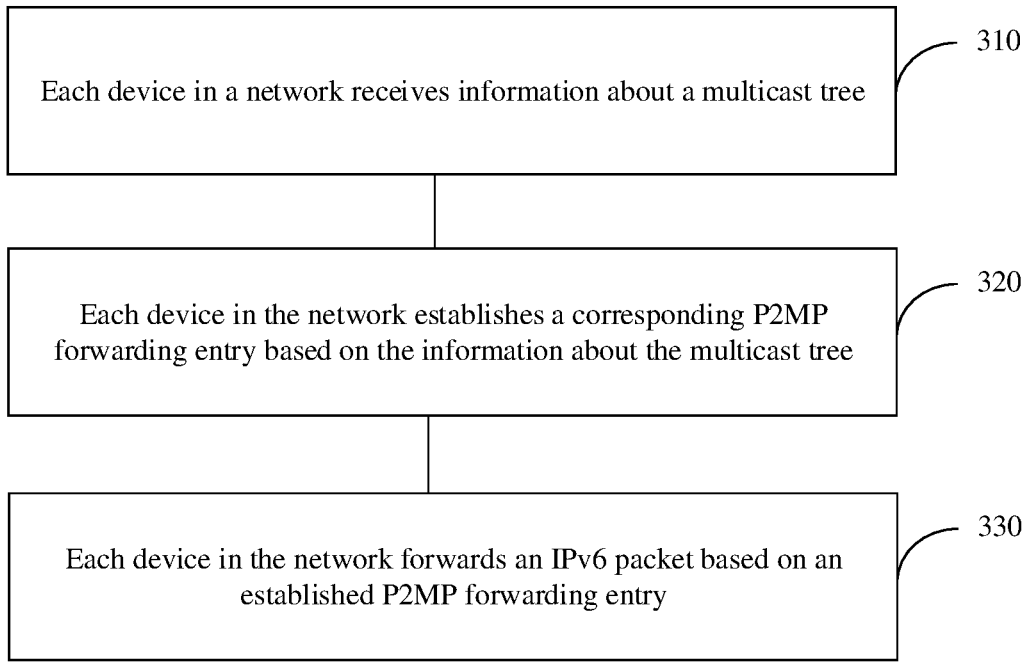
FIG. 3 is a schematic flowchart of another packet forwarding method according to an embodiment of this application.

The scenario shown in FIG. 1 is used as an example, and with reference to FIG. 3, the following describes in detail a specific implementation process of a packet forwarding method provided in this embodiment of this application.

It should be understood that the example in FIG. 3 is merely intended to help a person skilled in the art understand embodiments of this application, and is not intended to limit the embodiments of this application to a specific value or a specific scenario of the example. A person skilled in the art clearly can make various equivalent modifications or changes apparently according to the following example in FIG. 3, and such modifications or changes also fall within the scope of embodiments of this application.

FIG. 3 is a schematic flowchart of another packet forwarding method according to an embodiment of this application. As shown in FIG. 3, the method may include steps 310-330. The following separately describes steps 310-330 in detail.

It should be understood that the foregoing multicast path may also be referred to as a multicast tree. In FIG. 3, the multicast tree is used as an example for description.

Step 310: Each device in a network receives information about a multicast tree.

In this embodiment of this application, when a plurality of multicast trees with a root node R1 are established, one address needs to be allocated to each multicast tree on R1.

In a possible implementation, for example, a multicast tree that uses R1 as a root node and that is identified by a solid line needs to be established as shown in FIG. 1, and an address R1_1 of R1 needs to be allocated. The address R1_1 is sent to each node under the multicast tree, and branch information of the multicast tree on each node is sent.

It should be noted that the foregoing allocation and delivery process may be completed by using a controller, or may be completed by using a message of a device control plane. This is not specifically limited in this application.

Nodes under the multicast tree that uses R1 as a root node and that is identified by the solid line may include: R1, R3, R5, R6, R7, and R8. Information about the multicast tree that is identified by the solid line and that is received by each node is shown in Table 5.

TABLE 5

Information about the multicast tree identified by the solid line

R1: (tree = R1_1, branch = R3)
R3: (tree = R1_1, branch = R5/R6)
R5: (tree = R1_1, branch = R7/R8)
R6: (tree = R1_1, branch = Decap)
R7: (tree = R1_1, branch = Decap)
R8: (tree = R1_1, branch = Decap)

R1_1s used as an example. "tree=R1_1" indicates that a multicast tree is the multicast tree identified by the solid line shown in FIG. 1 and a correspondence relationship between the multicast tree and the source address R1_1, and "branch=R3" indicates that a downstream device of R1_1s R3.

R5 is used as an example, a multicast tree is the multicast tree identified by the solid line shown in FIG. 1, and downstream devices of R3 are R7 and R8. For R6, a multicast tree is the multicast tree identified by the solid line shown in FIG. 1, and "branch=Decap" indicates that R6 is a leaf (leaf) device, and needs to decapsulate an encapsulated multicast packet, and then forward a multicast packet at an internal layer.

In another possible implementation, for example, a multicast tree that uses R1 as a root node and that is identified by a dashed line needs to be established as shown in FIG. 1, and an address R1_2 of R1 needs to be allocated. The address R1_2 is sent to each node under the multicast tree, and branch information of the multicast tree on each node is sent.

It should be noted that the foregoing allocation and delivery process may be completed by using a controller, or may be completed by using a message of a control plane. This is not specifically limited in this application.

Nodes under the multicast tree that uses R1 as a root node and that is identified by the dashed line may include: R1, R3, R5, R6, R7, and R8. Information about the multicast tree that is identified by the dashed line and that is received by each node is shown in Table 6.

TABLE 6

Information about the multicast tree identified by the dashed line

R1: (tree = R1_2, branch = R3)
R3: (tree = R1_2, branch = R5/R6)
R5: (tree = R1_2, branch = R7)
R6: (tree = R1_2, branch = Decap)
R7: (tree = R1_2, branch = Decap)
R8: (tree = R1_2, branch = Decap)

R1_1s used as an example. "tree=R1_2" indicates that a multicast tree is the multicast tree identified by the dashed line shown in FIG. 1 and a correspondence relationship between the multicast tree and the source address R1_2, and "branch=R3" indicates that a downstream device of R1_1s R3.

R5 is used as an example, a multicast tree is the multicast tree identified by the dashed line shown in FIG. 1, and a downstream device of R3 is R7. For R6, a multicast tree is the multicast tree identified by the dashed line shown in FIG. 1, and "branch=Decap" indicates that R6 is a leaf device, and needs to decapsulate an encapsulated multicast packet, and then forward a multicast packet at an internal layer.

Step 320: Each device in the network establishes a correspondence relationship based on information about a multicast tree.

The multicast tree identified by the solid line shown in FIG. 1 is used as an example. A correspondence relationship established by each device in the network based on the information about the multicast tree shown in Table 5 is shown in Table 7.

TABLE 7

Correspondence relationship of the multicast tree identified by the solid line

R1: (SA = R1_1, branch_IP = R3_0)
R3: (SA = R1_1, branch_IP = R5_0/R6_0)
R5: (SA = R1_1, branch_IP = R7_0/R8_0)
R6: (SA = R1_1, branch_IP = Decap)
R7: (SA = R1_1, branch_IP = Decap)
R8: (SA = R1_1, branch_IP = Decap)

It should be understood that each device in the network configures one first address as a destination address of a packet, and the first address is used to indicate to search for, based on the destination address of the packet, a source address corresponding to the packet. When the destination address of the packet received on the device is the first address, the device searches for the source address of the packet.

As an example, first addresses allocated by R1, R3, R5, R6, R7, and R8 are respectively R1_0, R3_0, R5_0, R6_0, R7_0, and R8_0. When a destination address of a packet received on R1_1s R1_0, R1 searches for a source address of the packet. When a destination address of a packet received on R3 is R3_0, R3 searches for a source address of the packet; and so on.

R1_1s used as an example. A multicast tree is the multicast tree identified by the solid line shown in FIG. 1, and a downstream device of R1_1s R3. Therefore, a source address represented by "SA=R1_1" in a correspondence relationship established by R1_1s R1_1, and "branch_IP=R3_0" indicates that an IP address of the downstream device of R1_1s the first address R3_0 allocated by R3.

R5 is used as an example. A multicast tree is the multicast tree identified by the solid line shown in FIG. 1, and downstream devices of R5 are R7 and R8. Therefore, a source address represented by "SA=R1_1" in a correspondence relationship established by R5 is R1_1, and "branch_IP=R7_0/R8_0" indicates that IP addresses of the downstream devices of R5 are the first address R7_0 allocated by R7 and the first address R8_0 allocated by R8.

The multicast tree identified by the dashed line shown in FIG. 1 is used as an example. A correspondence relationship established by each device in the network based on the information about the multicast tree shown in Table 6 is shown in Table 8.

TABLE 8

Correspondence relationship of the multicast tree identified by the dashed line

R1: (SA = R1_2, branch_IP = R3_0)
R3: (SA = R1_2, branch_IP = R5_0/R6_0)

TABLE 8-continued

Correspondence relationship of the multicast
tree identified by the dashed line

R5: (SA = R1__2, branch_IP = R7__0)
R6: (SA = R1__2, branch_IP = Decap)
R7: (SA = R1__2, branch_IP = Decap)
R8: (SA = R1__2, branch_IP = Decap)

Step 330: Each device in the network forwards an IPv6 packet based on the established correspondence relationship.

In a possible implementation, the multicast tree identified by the solid line shown in FIG. 1 is used as an example, and a process of forwarding the IPv6 packet by the device in the network is described in detail based on the correspondence relationship shown in Table 7.

R1 receives a multicast packet of a multicast source group (S1, G1) from an interface belonging to a virtual routing forwarding (VRF) instance VRF1. A forwarding plane of R1 may import a multicast flow (VRF1, S1, G1) into the multicast tree identified by the solid line, and forward the multicast flow (VRF1, S1, G1) along the multicast tree identified by the solid line.

As an example, R1 may import, based on the following configuration information, the multicast flow information (VRF1, S1, G1) into the multicast tree identified by the solid line:

R1: (vrf1, S1, G1, tree=R1_1)

R1 may further encapsulate the multicast packet of the multicast source group (S1, G1) based on the following correspondence relationship, so that the multicast packet of the multicast source group (S1, G1) can be forwarded along the multicast tree identified by the solid line. Specifically, R1 encapsulates an IPv6 header at an outer layer for the multicast packet, where a source address of the IPv6 header at the outer layer is R1_1, and a destination address thereof is the first address R10 allocated by R1.

R1: (vrf1, S1, G1, SA=R1_1, DA=R1_0)

R1 obtains that a destination address of the IPv6 header at the outer layer of the packet is R1_0, and searches for a source address SA of the packet based on an indication of R1_0. R1 determines that the source address SA of the packet is R1_1, and determines, based on the correspondence relationship shown in Table 7, that branch_IP corresponding to SA=R1_1 is R3_0. Therefore, R1 learns that the packet needs to be "replicated" to R3_0, and the forwarding plane of R1 may modify the destination address of the packet to R3_0 and send the packet to node R3.

The destination address of the packet received by R3 is R3_0, and R3 searches for the source address SA of the packet based on an indication that the destination address is R3_0. R3 determines that the source address SA of the packet is R1_1, and determines, based on the correspondence relationship shown in Table 7, that branch_IP corresponding to SA=R1_1 is R5_0/R6_0. Therefore, R3 learns that the packet needs to be "replicated" to R5_0 and R6_0. A forwarding plane of R3 may modify the destination address of the packet to R5_0 and send the packet to node R5, and modify the destination address of the packet to R6_0 and send the packet to node R6.

The destination address of the packet received by R5 is R5_0, and R5 searches for the source address SA of the packet based on an indication that the destination address is R5_0. The R5 determines that the source address SA of the packet is R1_1, and determines, based on the correspondence relationship shown in Table 7, that branch_IP corresponding to SA=R1_1 is R7_0/R8_0. Therefore, R5 learns that the packet needs to be "replicated" to R7_0 and R8_0. A forwarding plane of R5 may modify the destination address of the packet to R7_0 and send the packet to node R7, and modify the destination address of the packet to R8_0 and send the packet to node R8.

A destination address of a packet received by R6 is R6_0, and R6 searches for a source address SA of the packet based on an indication that the destination address is R6_0. The R6 determines that the source address SA of the packet is R1_1, and determines, based on the correspondence relationship shown in Table 7, that branch_IP corresponding to SA=R1_1 is Decap. Therefore, R6 determines that R6 itself is a leaf (leaf) device, and R6 decapsulates an encapsulated multicast packet, and then forwards a multicast packet at an internal layer.

The destination address of the packet received by R7 is R7_0, and R7 searches for the source address SA of the packet based on an indication that the destination address is R7_0. The R7 determines that the source address SA of the packet is R1_1, and determines, based on the correspondence relationship shown in Table 7, that branch_IP corresponding to SA=R1_1 is Decap. Therefore, R7 determines that R7 itself is a leaf (leaf) device, and R7 decapsulates an encapsulated multicast packet, and then forwards a multicast packet at an internal layer.

The destination address of the packet received by R8 is R8_0, and R8 searches for the source address SA of the packet based on an indication that the destination address is R8_0. The R8 determines that the source address SA of the packet is R1_1, and determines, based on the correspondence relationship shown in Table 7, that branch_IP corresponding to SA=R1_1 is Decap. Therefore, R8 determines that R8 itself is a leaf device, and R8 decapsulates an encapsulated multicast packet, and then forwards a multicast packet at an internal layer.

In another possible implementation, the multicast tree identified by the dashed line shown in FIG. 1 is used as an example, and a process of forwarding the IPv6 packet by the device in the network is described in detail based on the correspondence relationship shown in Table 8.

R1 receives a multicast packet of a multicast source group (S2, G2) from an interface belonging to a virtual routing forwarding (VRF) instance VRF2. A forwarding plane of R1 may import multicast flow information (VRF2, S2, G2) into the multicast tree identified by the dashed line, and forward the multicast flow information (VRF2, S2, G2) along the multicast tree identified by the dashed line.

As an example, R1 may import, based on the following configuration information, the multicast flow information (VRF2, S2, G2) into the multicast tree identified by the solid line.

R1: (vrf2, S2, G2, tree=R1_2)

R1 may further encapsulate a multicast packet of the multicast source group (S2, G2) based on the following correspondence relationship, so that the multicast packet of the multicast source group (S2, G2) can be forwarded along the multicast tree identified by the dashed line. Specifically, R1 encapsulates an IPv6 header at an outer layer for the multicast packet, where a source address of the IPv6 header at the outer layer is R1_2, and a destination address thereof is the first address R1_0 allocated by R1.

R1: (vrf2, S2, G2, SA=R1_2, DA=R1_0)

R1 obtains that the destination address of the IPv6 header at the outer layer of the packet is R1_0, and searches for the source address SA of the packet based on an indication of R1_0. R1 determines that the source address SA of the packet is R1_2, and determines, based on the correspondence relationship shown in Table 8, that branch_IP corresponding to SA=R1_2 is R3_0. Therefore, R1 learns that the packet needs to be "replicated" to R3_0, and a forwarding plane of R1 may modify the destination address of the packet to R3_0 and send the packet to node R3.

The destination address of the packet received by R3 is R3_0, and R3 searches for the source address SA of the packet based on an indication that the destination address is R3_0. R3 determines that the source address SA of the packet is R1_2, and determines, based on the correspondence relationship shown in Table 8, that branch_IP corresponding to SA=R1_2 is R5_0/R6_0. Therefore, R3 learns that the packet needs to be "replicated" to R5_0 and R6_0. A forwarding plane of R3 may modify the destination address of the packet to R5_0 and send the packet to node R5, and modify the destination address of the packet to R6_0 and send the packet to node R6.

The destination address of the packet received by R5 is R5_0, and R5 searches for the source address SA of the packet based on an indication that the destination address is R5_0. R5 determines that the source address SA of the packet is R1_2, and determines, based on the correspondence relationship shown in Table 8, that branch_IP corresponding to SA=R1_2 is R7_0. Therefore, R5 learns that the packet needs to be "replicated" to R7_0, and a forwarding plane of R5 may modify the destination address of the packet to R7_0 and send the packet to node R7.

A destination address of a packet received by R6 is R6_0, and R6 searches for a source address SA of the packet based on an indication that the destination address is R6_0. R6 determines that the source address SA of the packet is R1_2, and determines, based on the correspondence relationship shown in Table 8, that branch_IP corresponding to SA=R1_2 is Decap. Therefore, R6 determines that R6 itself is a leaf device, and R6 decapsulates an encapsulated multicast packet, and then forwards a multicast packet at an internal layer.

The destination address of the packet received by R7 is R7_0, and R7 searches for the source address SA of the packet based on an indication that the destination address is R7_0. R7 determines that the source address SA of the packet is R1_2, and determines, based on the correspondence relationship shown in Table 8, that branch_IP corresponding to SA=R1_2 is Decap. Therefore, R7 determines that R7 itself is a leaf device, and R7 decapsulates an encapsulated multicast packet, and then forwards a multicast packet at an internal layer.

Figure 4:
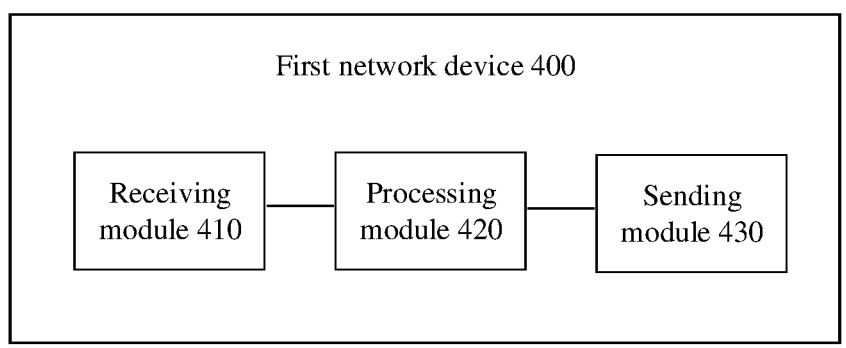
FIG. 4 is a schematic diagram of a structure of a first network device 400 according to an embodiment of this application.
Figure 5:
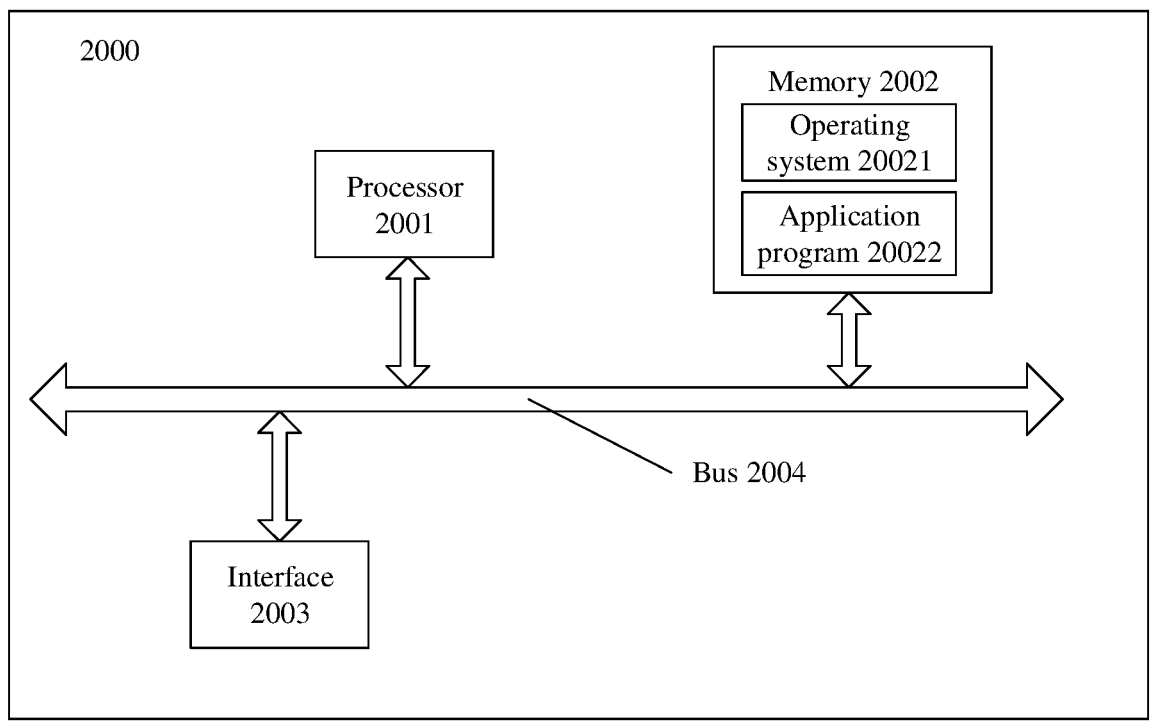
FIG. 5 is a schematic diagram of a hardware structure of a first network device 2000 according to an embodiment of this application.
Figure 6:
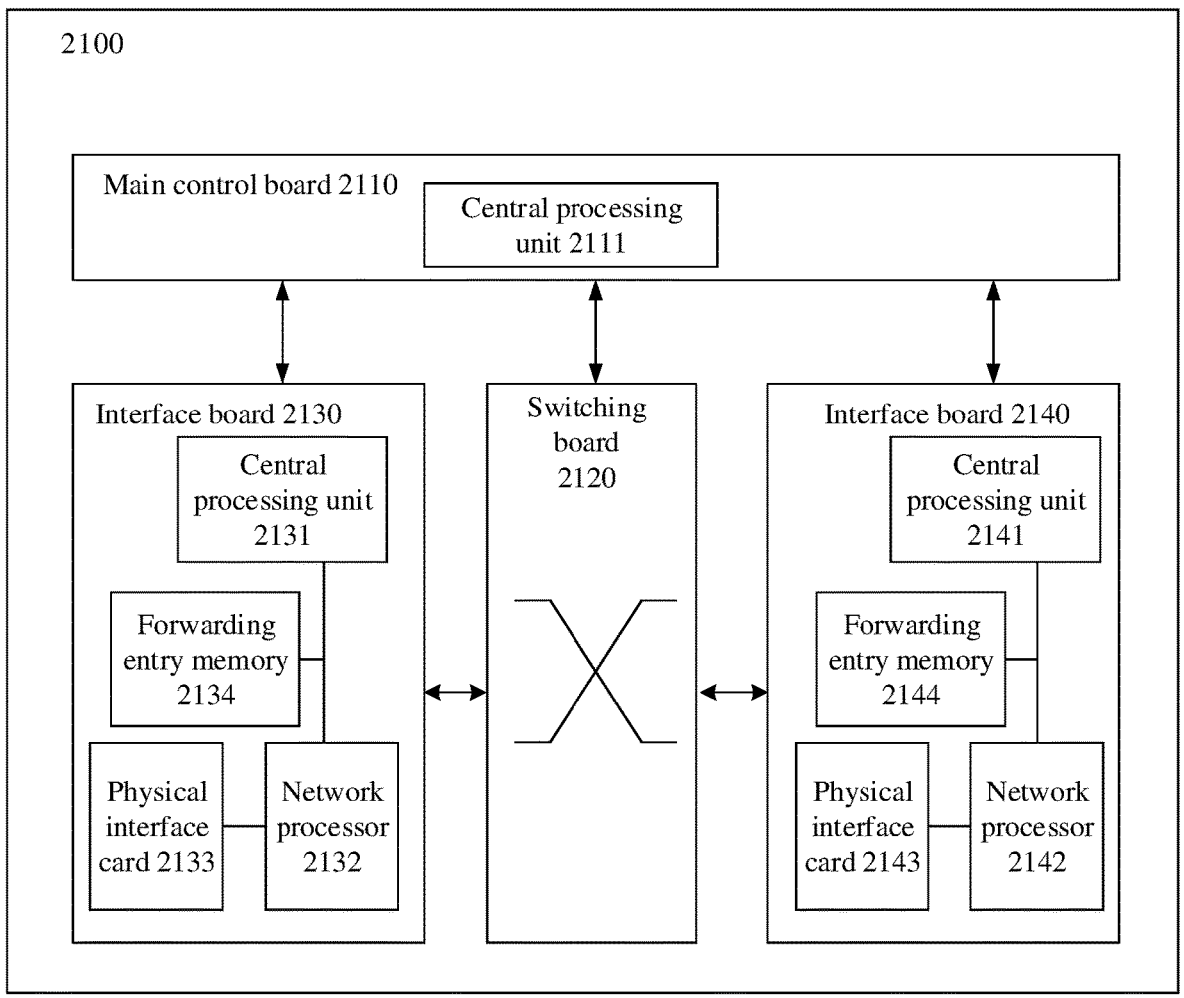
FIG. 6 is a schematic diagram of a hardware structure of another first network device 2100 according to an embodiment of this application.

With reference to FIG. 1 to FIG. 3, the foregoing describes in detail a packet forwarding method according to an embodiment of this application. With reference to FIG. 4 to FIG. 6, the following describes in detail an embodiment of an apparatus according to this application. It should be understood that the description of the method embodiment corresponds to the description of the apparatus embodiment. Therefore, for a part that is not described in detail, references may be made to the foregoing method embodiment.

FIG. 4 is a schematic diagram of a structure of a first network device 400 according to an embodiment of this application. The first network device 400 shown in FIG. 4 may perform corresponding steps performed by the first network device in the method in the foregoing embodiment. As shown in FIG. 4, the first network device 400 includes a receiving module 410, a processing module 420, and a sending module 430.

The receiving module 410 is configured to obtain a first packet, where the first packet includes a multicast packet.

The processing module 420 is configured to determine a next-hop destination address DA of the multicast packet based on a source address SA and a first correspondence relationship, where the SA is used to identify a multicast path corresponding to the multicast packet, and the first correspondence relationship includes the SA and the next-hop DA of the first network device on the multicast path.

The processing module 420 is further configured to obtain a second packet based on the next-hop DA, where the second packet is a unicast packet obtained after IPv6 encapsulation is performed on the multicast packet.

The sending module 430 is configured to forward the second packet along the multicast path based on the next-hop DA.

Optionally, the processing module 420 is further configured to determine the SA.

Optionally, the first network device is an ingress device, the first packet is the multicast packet, and the processing module 420 is specifically configured to: determine the multicast path corresponding to the multicast packet; and determine the SA based on the multicast path and a correspondence relationship between a multicast path and an SA.

Optionally, the first network device is a transit device or an egress device, the first packet is a unicast packet obtained after IPv6 encapsulation is performed on the multicast packet, and the processing module 420 is specifically configured to: determine whether a DA of the first packet is an IPv6 address of the first network device; and if the DA of the first packet is the IPv6 address of the first network device, read an SA of the first packet based on the DA of the first packet.

Optionally, the receiving module 410 is further configured to receive configuration information from a control device, where the configuration information includes the SA and a multicast path corresponding to the multicast packet; and the processing module 420 is further configured to establish the first correspondence relationship based on the configuration information.

Optionally, the multicast path includes an internet protocol version 6 IPv6 address of a next-hop device of the first network device, and the sending module 430 is specifically configured to send the second packet to the next-hop device based on that the next-hop DA is the IPv6 address of the next-hop device.

Optionally, the multicast path indicates to decapsulate a packet, and the processing module is further configured to decapsulate the second packet to obtain the multicast packet; and the sending module 430 is further configured to forward the multicast packet.

Optionally, the SA is an IPv6 address.

FIG. 5 is a schematic diagram of a hardware structure of a first network device 2000 according to an embodiment of this application. The first network device 2000 shown in FIG. 5 may perform corresponding steps performed by the first network device in the method in the foregoing embodiment.

As shown in FIG. 5, the first network device 2000 includes a processor 2001, a memory 2002, an interface 2003, and a bus 2004. The interface 2003 may be implemented in a wireless or wired manner, specifically, may be a network interface card. The processor 2001, the memory 2002, and the interface 2003 are connected by using the bus 2004.

The interface 2003 may specifically include a transmitter and a receiver, and is configured to implement the foregoing receiving and sending by the first network device. For example, the interface 2003 is configured to obtain a first packet, or is configured to send a second packet.

The processor 2001 is configured to perform processing performed by the first network device in the foregoing embodiment. For example, the processor 2001 is configured to: determine a next-hop DA of a multicast packet based on a source address SA and a first correspondence relationship; and obtain a second packet based on the next-hop DA; and/or other processes of technologies described herein. The memory 2002 includes an operating system 20021 and an application program 20022, and is configured to store a program, code, or instructions. When the processor or a hardware device executes the program, the code, or the instructions, a processing process related to the first network device in the method embodiment may be completed. Optionally, the memory 2002 may include a read-only memory (ROM) and a random access memory (RAM). The ROM includes a basic input/output system (BIOS) or an embedded system. The RAM includes an application program and an operating system. When the first network device 2000 needs to be run, the BIOS that is built in the ROM or a bootloader boot system in the embedded system is used to start, to guide the first network device 2000 to enter a normal running state. After the first network device 2000 enters the normal running state, the application program and the operating system in the RAM are run. Therefore, a processing process of the first network device 2000 in the method embodiment is completed.

It may be understood that FIG. 5 shows only a simplified design of the first network device 2000. In actual application, the first network device may include any quantity of interfaces, processors, or memories.

FIG. 6 is a schematic diagram of a hardware structure of another first network device 2100 according to an embodiment of this application. The first network device 2100 shown in FIG. 6 may perform corresponding steps performed by the first network device in the method in the foregoing embodiment.

As shown in FIG. 6, the first network device 2100 includes a main control board 2110, an interface board 2130, a switching board 2120, and an interface board 2140. The main control board 2110, the interface boards 2130 and 2140, and the switching board 2120 are interconnected by using a system bus and a system backplane. The main control board 2110 is configured to implement functions such as system management, device maintenance, and protocol processing. The switching board 2120 is configured to exchange data between the interface boards (also referred to as line cards or service boards). The interface boards 2130 and 2140 are configured to provide various service interfaces (such as a POS interface, a GE interface and an ATM interface) and implement data packet forwarding.

The interface board 2130 may include a central processing unit 2131, a forwarding entry memory 2134, a physical interface card 2133, and a network processor 2132. The central processing unit 2131 is configured to control and manage the interface board and communicate with the central processing unit on the main control board. The forwarding entry memory 2134 is configured to store an entry, for example, the foregoing BIFT. The physical interface card 2133 is configured to receive and send traffic.

It should be understood that, in this embodiment of this application, an operation on the interface board 2140 is the same as an operation on the interface board 2130. For brevity, details are not described again.

It should be understood that the first network device 2100 in this embodiment may correspond to functions and/or steps implemented in the foregoing method embodiments, and details are not described herein again.

In addition, it should be noted that there may be one or more main control boards. When there are a plurality of main control boards, an active main control board and a standby main control board may be included. There may be one or more interface boards. The stronger a data processing capability of the first network device is, the more interface boards are provided. There may also be one or more physical interface cards on the interface board. There may be no switching board or one or more switching boards. When there are a plurality of switching boards, load balancing and redundancy backup may be implemented together. In a centralized forwarding architecture, the first network device may not need a switching board, and the interface board undertakes a service data processing function of an entire system. In a distributed forwarding architecture, the first network device may have at least one switching board, to implement data exchange between a plurality of interface boards by using the switching board, and provide a large capacity data exchange and processing capability. Therefore, a data access and processing capability of the first network device in the distributed architecture is higher than that of a device in the centralized architecture. A specific architecture that is to be used depends on a specific networking deployment scenario. This is not limited herein.

An embodiment of this application further provides a computer readable medium, where the computer readable medium stores program code. When the computer program code is run on a computer, the computer performs the method performed by the foregoing first network device. The computer readable storage media includes but is not limited to one or more of the following: a read-only memory (ROM), a programmable ROM (PROM), an erasable PROM (EPROM), a Flash memory, an electrically EPROM (EEPROM), and a hard disk drive (hard drive).

An embodiment of this application further provides a chip system, applied to a first network device. The chip system includes: at least one processor, at least one memory, and an interface circuit, where the interface circuit is responsible for information exchange between the chip system and the outside, the at least one memory, the interface circuit, and the at least one processor are interconnected by using a line, and the at least one memory stores instructions. The instructions are executed by the at least one processor, to perform operations of the first network device in the methods in the aspects described above.

In a specific implementation process, the chip may be implemented in a form of a central processing unit (CPU), a micro controller unit (MCU), a micro processing unit (MPU), a digital signal processor (DSP), a system on chip (SoC), an application-specific integrated circuit (ASIC), a field programmable gate array (FPGA), or a programmable logic device (PLD).

An embodiment of this application further provides a computer program product, applied to a first network device, where the computer program product includes a series of instructions. When the instructions are run, operations of the first network device in the methods in the aspects described above are performed.

It should be understood that sequence numbers of the foregoing processes do not mean execution sequences in embodiments of this application. The execution sequences of the processes should be determined based on functions and internal logic of the processes, and should not constitute any limitation on implementation processes of the embodiments of this application.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in another manner. For example, the apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   obtaining, by a first network device, a first packet, wherein the first packet comprises a multicast packet;
   determining, by the first network device, a next-hop destination address (DA) of the multicast packet based on a source address (SA) of the multicast packet from a source device and a first correspondence relationship, wherein the SA of the multicast packet identifies a multicast path out of a plurality of multicast paths, the source device corresponding to a plurality of SAs including the SA, each SA of the plurality of SAs corresponding to a different multicast path of the plurality of multicast paths, the multicast path corresponding to the multicast packet, and the first correspondence relationship comprises the SA of the multicast packet and the next-hop DA of the multicast packet corresponding to the first network device and the multicast path;
   obtaining, by the first network device, a second packet based on the next-hop DA of the multicast packet, wherein the second packet is a unicast packet obtained after internet protocol version 6 (IPv6) encapsulation is performed on the multicast packet; and
   forwarding, by the first network device, the second packet along the multicast path based on the next-hop DA of the multicast packet.

2. The method according to claim 1, wherein the first network device is an ingress device, and the first packet is the multicast packet; and
   wherein the method further comprises:
      determining, by the first network device, the multicast path corresponding to the multicast packet; and
      determining, by the first network device, the SA of the multicast packet based on the multicast path and a correspondence relationship between the multicast path and the SA of the multicast packet.

3. The method according to claim 1, wherein the first network device is a transit device, and the first packet is a unicast packet obtained after IPV6 encapsulation is performed on the multicast packet; and
   wherein the method further comprises:
      determining, by the first network device, whether a DA of the first packet is an IPV6 address of the first network device; and
      reading, by the first network device, an SA of the first packet based on the DA of the first packet in response to determining that the DA of the first packet is the IPV6 address of the first network device.

4. The method according to claim 1, wherein the first network device is an egress device, and the first packet is a unicast packet obtained after IPV6 encapsulation is performed on the multicast packet; and
   wherein the method further comprises:
      determining, by the first network device, whether a DA of the first packet is an IPv6 address of the first network device; and
      reading, by the first network device, an SA of the first packet based on the DA of the first packet in response to determining that the DA of the first packet is the IPV6 address of the first network device.

5. The method according to claim 1, further comprising:
   receiving, by the first network device, configuration information from a control device, wherein the configuration information comprises the SA of the multicast packet and the multicast path corresponding to the multicast packet; and establishing, by the first network device, the first correspondence relationship based on the configuration information.

6. The method according to claim 5, wherein the multicast path comprises an IPV6 address of a next-hop device of the first network device; and
wherein forwarding, by the first network device, the second packet along the multicast path based on the next-hop DA of the multicast packet comprises:
sending, by the first network device, the second packet to the next-hop device of the first network device based on the next-hop DA of the multicast packet being the IPv6 address of the next-hop device of the first network device.

7. The method according to claim 5, wherein the multicast path indicates to decapsulate a packet, and the method further comprises:
decapsulating, by the first network device, the second packet to obtain the multicast packet; and
forwarding, by the first network device, the multicast packet.

8. The method according to claim 1, wherein the SA of the multicast packet is an IPV6 address.

9. A first network device, comprising:
a non-transitory memory storing instructions; and
a processor coupled to the non-transitory memory,
wherein the instructions, when executed by the processor, cause the first network device to be configured to:
obtain a first packet, wherein the first packet comprises a multicast packet;
determine a next-hop destination address (DA) of the multicast packet based on a source address (SA) of the multicast packet from a source device and a first correspondence relationship, wherein the SA of the multicast packet identifies a multicast path out of a plurality of multicast paths, the source device corresponding to a plurality of SAs including the SA, each SA of the plurality of SAs corresponding to a different multicast path of the plurality of multicast paths, the multicast path corresponding to the multicast packet, and the first correspondence relationship comprises the SA of the multicast packet and the next-hop DA of the multicast packet corresponding to the first network device and the multicast path;
obtain a second packet based on the next-hop DA of the multicast packet, wherein the second packet is a unicast packet obtained after internet protocol version 6 (IPv6) encapsulation is performed on the multicast packet; and
forward the second packet along the multicast path based on the next-hop DA of the multicast packet.

10. The first network device according to claim 9, wherein the first network device is an ingress device, and the first packet is the multicast packet; and
wherein the instructions, when executed by the processor, further cause the first network device to be configured to:
determine the multicast path corresponding to the multicast packet; and
determine the SA of the multicast packet based on the multicast path and a correspondence relationship between the multicast path and the SA of the multicast packet.

11. The first network device according to claim 9, wherein the first network device is a transit device, and the first packet is a unicast packet obtained after IPV6 encapsulation is performed on the multicast packet; and wherein the instructions, when executed by the processor, further cause the first network device to be configured to:
determine whether a DA of the first packet is an IPV6 address of the first network device; and
read an SA of the first packet based on the DA of the first packet in response to determining that the DA of the first packet is the IPV6 address of the first network device.

12. The first network device according to claim 9, wherein the first network device is an egress device, and the first packet is a unicast packet obtained after IPV6 encapsulation is performed on the multicast packet; and
wherein the instructions, when executed by the processor, further cause the first network device to be configured to:
determine whether a DA of the first packet is an IPV6 address of the first network device; and
read an SA of the first packet based on the DA of the first packet in response to determining that the DA of the first packet is the IPV6 address of the first network device.

13. The first network device according to claim 9, wherein the instructions, when executed by the processor, further cause the first network device to be configured to:
receive configuration information from a control device, wherein the configuration information comprises the SA of the multicast packet and the multicast path corresponding to the multicast packet; and
establish the first correspondence relationship based on the configuration information.

14. The first network device according to claim 13, wherein the multicast path comprises an internet protocol version 6 (IPv6) address of a next-hop device of the first network device, and the instructions, when executed by the processor, further cause the first network device to be configured to:
send the second packet to the next-hop device of the first network device based on a next-hop DA of the first network device being the IPV6 address of the next-hop device of the first network device.

15. The first network device according to claim 13, wherein the multicast path indicates to decapsulate a packet; and the instructions, when executed by the processor, further cause the first network device to be configured to:
decapsulate the second packet to obtain the multicast packet; and
forward the multicast packet.

16. The first network device according to claim 9, wherein the SA of the multicast packet is an IPV6 address.

17. A non-transitory computer readable storage medium storing instructions that are executable by at least one processor, wherein the non-transitory computer readable storage medium is applied to a first network device, and the instructions comprise instructions for:
obtaining a first packet, wherein the first packet comprises a multicast packet;
determining a next-hop destination address (DA) of the multicast packet based on a source address (SA) of the multicast packet from a source device and a first correspondence relationship, wherein the SA of the multicast packet identifies a multicast path out of a plurality of multicast paths, the source device corresponding to a plurality of SAs including the SA, each SA of the plurality of SAs corresponding to a different multicast path of the plurality of multicast paths, the multicast path corresponding to the multicast packet, and the first correspondence relationship comprises the SA of the multicast packet and the next-hop DA of the multicast packet corresponding to the first network device and the multicast path;

obtaining a second packet based on the next-hop DA of the multicast packet, wherein the second packet is a unicast packet obtained after internet protocol version 6 (IPv6) encapsulation is performed on the multicast packet; and forwarding the second packet along the multicast path based on the next-hop DA of the multicast packet.

18. The non-transitory computer readable storage medium according to claim 17, wherein the first network device is an ingress device, and the first packet is the multicast packet; and wherein the instructions further comprise instructions for:
determining the multicast path corresponding to the multicast packet; and
determining the SA of the multicast packet based on the multicast path and a correspondence relationship between the multicast path and the SA of the multicast packet.

19. The non-transitory computer readable storage medium according to claim 17, wherein the first network device is a transit device, and the first packet is a unicast packet obtained after IPv6 encapsulation is performed on the multicast packet; and wherein the instructions further comprise instructions for:
determining whether a DA of the first packet is an IPV6 address of the first network device; and
reading an SA of the first packet based on the DA of the first packet in response to determining that the DA of the first packet is the IPV6 address of the first network device.

20. The non-transitory computer readable storage medium according to claim 17, wherein the first network device is an egress device, and the first packet is a unicast packet obtained after IPv6 encapsulation is performed on the multicast packet; and wherein the instructions further comprise instructions for:
determining whether a DA of the first packet is an IPv6 address of the first network device; and
reading an SA of the first packet based on the DA of the first packet in response to determining that the DA of the first packet is the IPV6 address of the first network device.

* * * * *

UNITED STATES PATENT AND TRADEMARK OFFICE
CERTIFICATE OF CORRECTION

PATENT NO. : 12,476,904 B2  
APPLICATION NO. : 18/154399  
DATED : November 18, 2025  
INVENTOR(S) : Xie et al.

Page 1 of 2

It is certified that error appears in the above-identified patent and that said Letters Patent is hereby corrected as shown below:

In the Claims

In Column 22, in Claim 3, Line 40, delete "IPV6" and insert -- IPv6 --.

In Column 22, in Claim 3, Line 44, delete "IPV6" and insert -- IPv6 --.

In Column 22, in Claim 3, Line 49, delete "IPV6" and insert -- IPv6 --.

In Column 22, in Claim 4, Line 52, delete "IPV6" and insert -- IPv6 --.

In Column 22, in Claim 4, Line 61, delete "IPV6" and insert -- IPv6 --.

In Column 23, in Claim 6, Line 5, delete "IPV6" and insert -- IPv6 --.

In Column 23, in Claim 8, Line 23, delete "IPV6" and insert -- IPv6 --.

In Column 23, in Claim 11, Line 66, delete "IPV6" and insert -- IPv6 --.

In Column 24, in Claim 11, Line 4, delete "IPV6" and insert -- IPv6 --.

In Column 24, in Claim 11, Line 8, delete "IPV6" and insert -- IPv6 --.

In Column 24, in Claim 12, Line 12, delete "IPV6" and insert -- IPv6 --.

In Column 24, in Claim 12, Line 17, delete "IPV6" and insert -- IPv6 --.

In Column 24, in Claim 12, Line 21, delete "IPV6" and insert -- IPv6 --.

Signed and Sealed this  
Thirteenth Day of January, 2026

John A. Squires  
*Director of the United States Patent and Trademark Office*

CERTIFICATE OF CORRECTION (continued)
U.S. Pat. No. 12,476,904 B2

In Column 24, in Claim 14, Line 40, delete "IPV6" and insert -- IPv6 --.

In Column 24, in Claim 16, Line 50, delete "IPV6" and insert -- IPv6 --.

In Column 26, in Claim 19, Line 5, delete "IPV6" and insert -- IPv6 --.

In Column 26, in Claim 19, Line 9, delete "IPV6" and insert -- IPv6 --.

In Column 26, in Claim 20, Line 21, delete "IPV6" and insert -- IPv6 --.